US007929864B2

(12) United States Patent
Chen et al.

(10) Patent No.: US 7,929,864 B2

(45) Date of Patent: Apr. 19, 2011

(54) OPTICAL BEAMFORMING TRANSMITTER

(75) Inventors: Young-Kai Chen, Berkeley Heights, NJ (US); Andreas Leven, Gillette, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 606 days.

(21) Appl. No.: 11/366,145

(22) Filed: Mar. 2, 2006

(65) Prior Publication Data

US 2007/0206958 A1 Sep. 6, 2007

(51) Int. Cl.
*H04B 10/00* (2006.01)
*H04B 10/04* (2006.01)

(52) U.S. Cl. ........ 398/115; 398/117; 398/186; 398/188; 398/198

(58) Field of Classification Search .................. 398/155, 398/115, 116, 117, 79, 82, 43, 182–201
See application file for complete search history.

(56) References Cited

U.S. PATENT DOCUMENTS 6,763,193 B1 * 7/2004 Chand et al. .................... 398/76
6,895,185 B1 5/2005 Chung et al.
2002/0196509 A1 * 12/2002 Smilanski et al. ............ 359/188
2003/0202794 A1 * 10/2003 Izadpanah et al. ............ 398/115
2004/0208642 A1 10/2004 Chen et al.
2005/0068887 A1 3/2005 Chen

OTHER PUBLICATIONS

Stulemeijer et al.; "Compact Photonic Integrated Phase and Amplitude Controller for Phased-Array Antennas", IEEE Photonics Technolgy Letters; vol. 11, No. 1; Jan. 1999; pp. 122-124.*
Stulemeijer et al.; Compact Photonic Integrated Phase and Amplitude Controller for Phased-Array Antennas; IEEE Photonics Technology Letters; vol. 11, No. 1; Jan. 1999; pp. 122-124.
Star Coupler, Wikipedia Article, http://en/wikipedia.org/wiki/Star__coupler, last modified May 7, 2009 at 15:13.

* cited by examiner

*Primary Examiner* — M. R. Sedighian
(74) *Attorney, Agent, or Firm* — Hitt Gaines

(57) ABSTRACT

The present invention provides an optical beamforming RF transmitter. In one embodiment, the optical beamforming RF transmitter includes an optical WDM splitter having an input and a plurality of outputs. The optical beamforming RF transmitter also includes an array of antennas, where each antenna has an optical input configured to drive the corresponding antenna, and an array of optical modulators, such that each modulator has an output connected to a corresponding one of the antennas and an input connected to one of the outputs of the optical WDM splitter. The optical beamforming RF transmitter further includes a mode-locked laser having an output optically coupled to the input of the optical WDM splitter.

20 Claims, 3 Drawing Sheets

OPTICAL BEAMFORMING TRANSMITTER

TECHNICAL FIELD OF THE INVENTION

The present invention is directed, in general, to the formation of RF transmission beams and, more specifically, to an optical beamforming RF transmitter and a method of generating an RF transmission beam optically.

BACKGROUND OF THE INVENTION

Phased array antenna systems, such as modern radar systems, require addressing each and every element in the entire phased array by using signals having a common frequency but with different amplitude and phase characteristics. This allows formation of a transmission beam having a specified width that can be directed toward a target of interest. Specification of the required transmission beam often requires obtaining a Fourier image of the required direction on the phase front of the antenna aperture, where aperture is just the distribution of the antenna elements over a physical antenna surface.

The transmission frequency of each antenna element needs to be carefully controlled to assure that the different amplitude and phase characteristics associated with each antenna element are predictable in forming the transmission beam. Ideally, it would be advantageous to use a common RF transmission source and deliver the output of this RF transmission source to every antenna element in the antenna phased array. However, the requirement to generally alter both the amplitude and phase of the transmission signals and deliver them to their associated antenna elements often becomes practically problematical due to RF domain components that add too much error, distortion or loss. These result in deterioration of the desired attributes for the transmission beam and a corresponding loss in desired performance for the system.

Accordingly, what is needed in the art is an enhanced beamforming architecture that overcomes the limitations of current systems.

SUMMARY OF THE INVENTION

To address the above-discussed deficiencies of the prior art, the present invention provides an optical beamforming RF transmitter. In one embodiment, the optical beamforming RF transmitter includes an optical WDM splitter having an input and a plurality of outputs. The optical beamforming RF transmitter also includes an array of antennas, where each antenna has an optical input configured to drive the corresponding antenna, and an array of optical modulators, where each modulator has an output connected to a corresponding one of the antennas and an input connected to one of the outputs of the optical WDM splitter. The optical beamforming RF transmitter further includes a mode-locked laser having an output optically coupled to the input of the optical WDM splitter.

In another aspect, the present invention provides a method of optically generating an RF transmission beam. In one embodiment, the method includes receiving in an optical WDM splitter an optical signal from a mode-locked laser, the optical signal having a sequence of spectral lines. The method also includes transmitting a portion of the signal from the optical WDM splitter to each of a plurality of optical modulators such that each optical modulator receives different ones of the spectral lines of the signal. The method further includes driving an array of antennas with optical signals output by the modulators in response to the transmitting, where each antenna receives an optical signal from a different one of the modulators.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
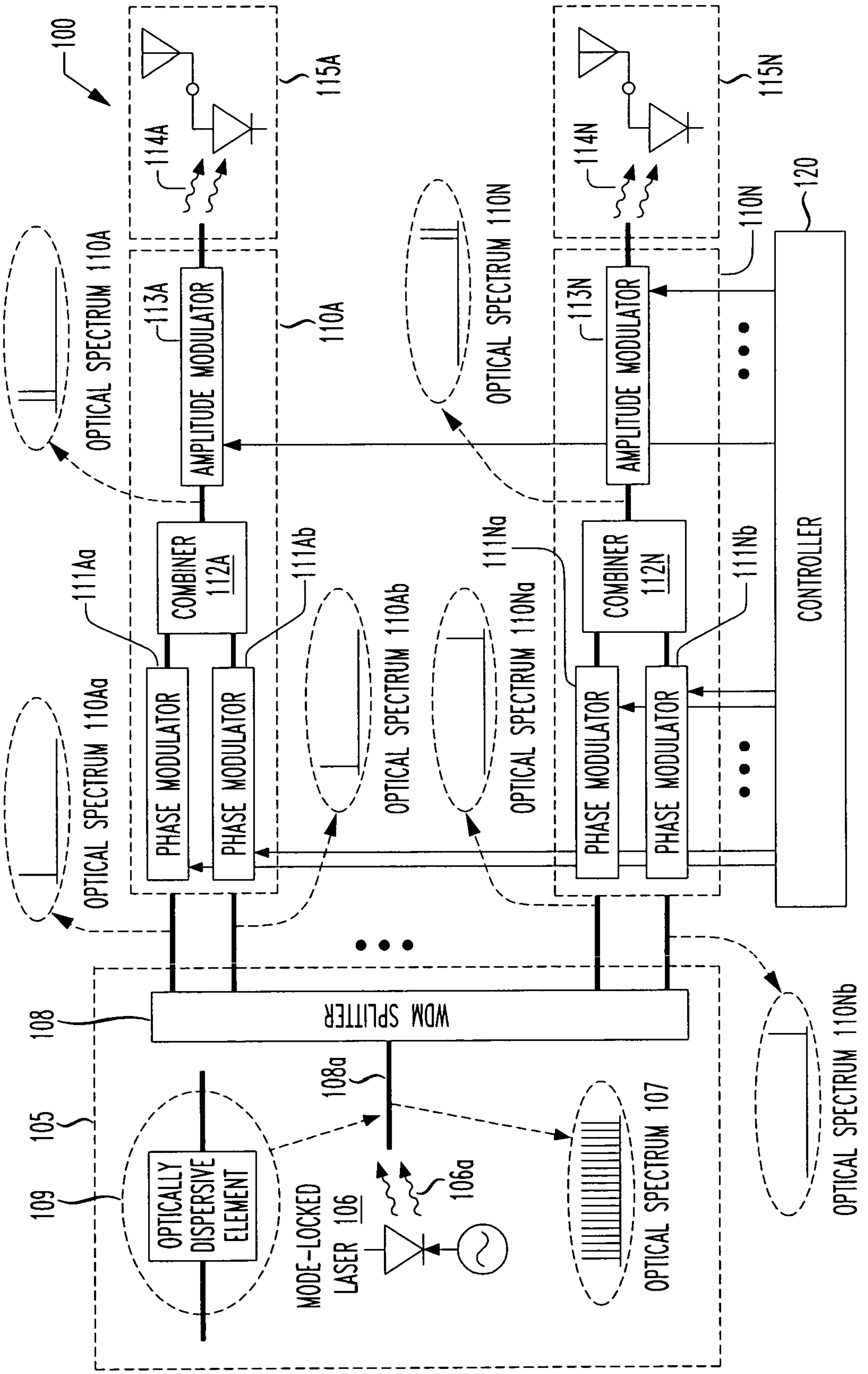
FIG. 1 illustrates a system diagram of an embodiment of an optical beamforming RF transmitter constructed in accordance with the principles of the present invention.

Referring initially to FIG. 1, illustrated is a system diagram of an embodiment of an optical beamforming RF transmitter, generally designated 100, constructed in accordance with the principles of the present invention. In the illustrated embodiment, the optical beamforming RF transmitter is a phased array radar transmitter that provides a directional radiation pattern from a multiple-element antenna array. Each element of the directional radiation pattern is first formed in the optical domain and then converted to the electrical domain for radiation by the radar antenna.

The optical domain provides the ability to independently modulate each element with respect to amplitude and phase in forming the directional radiation pattern. The present embodiment illustrates how a single directional radiation pattern at a single transmission frequency may be formed. However, one skilled in the pertinent art will understand that other embodiments may provide multiple patterns or multiple transmission frequencies that are transmitted either separately or concurrently.

The optical beamforming RF transmitter 100 includes an optical beamforming generator 105, an array of optical modulators 110A-110N, an array of optically-coupled antennas 115A-115N and a controller 120. The optical beamforming generator 105 includes a mode-locked laser 106, an optical wavelength division multiplexing (WDM) splitter 108 and an optional optically dispersive element 109. A first optical modulator 110A, which is exemplary of the remaining array of optical modulators 110A-110N, includes first and second phase modulators 111Aa, 111Ab, a first combiner 112A and a first amplitude modulator 113A. The first optically-coupled antenna 115A receives a first optical signal 114A that is output from the first optical modulator 110A, as shown.

The mode-locked laser 106 provides an optical pulse having a repetition rate that is mode-locked to the RF transmitter's transmission or radiation frequency. Any of several implementations of a mode-locked laser may be employed to accomplish this. For example, the mode-locked laser 106 may employ a fiber loop supported by a gain medium or an element that is inserted such as a phase or an amplitude modulator, which injects an outside RF tone. Alternatively, the mode-locked laser 106 may be semiconductor based or employ another current or future implementation. In any case, this optical cavity thereby provides a short optical pulse propagating with a travel time or repetition rate that is adjusted by an external RF reference source to lock the pulse.

Therefore, in the time domain, a very short optical pulse with a repetition rate set by the RF frequency of the external RF (or target transmission frequency) reference source is provided. In the frequency domain, this optical pulse provides a collection of narrowly spaced optical lines (i.e., a "comb" of optical spectral lines). Each of these optical spectral lines is separated by the repetition rate of the mode-locked laser 106, which is equivalent to the RF transmission frequency, and is shown graphically in a laser optical spectrum 107 of FIG. 1. In the illustrated embodiment, portions of this comb array of spectral lines in the optical domain are selected by the optical WDM splitter 108 to be used by the array of optical modulators 110A-110N to establish a directional radiation pattern at the RF transmission frequency. This may be contrasted to using a single RF carrier that is appropriately modulated to form the RF transmission beam. The ability to independently modulate the spectral lines selected from the comb spectrum allows the overall performance of the RF transmitter to be greatly enhanced, even providing multiple transmission beams or multiple transmission frequencies concurrently, as may be required.

The optical WDM splitter 108 is optically coupled to receive the laser output signal 106*a* from the mode-locked laser 106 through an optical input 108*a*. In the illustrated embodiment, coupling for the laser's output signal 106*a* is through an input optical fiber, but the optical coupling may be performed by other optical devices, as well. The optical WDM splitter 108 selects portions of the laser optical spectrum 107 to generate the RF transmission frequency. In the illustrated embodiment of FIG. 1, the portions selected are a set of adjacent individual spectral lines. In the embodiment to be discussed with respect to FIG. 2, the portions selected are a set of pairs of adjacent spectral lines. In both of these cases, the spectral lines used in each beamforming element employ adjacent pairs of spectral lines, since their separation corresponds to the single RF transmission frequency generated in these embodiments.

The individual spectral lines of the laser optical spectrum 107 represent light of different wavelengths (i.e., different colors). In the illustrated embodiment of FIG. 1, the WDM splitter 108 operates as a demultiplexer having a free spectral range periodicity (i.e., channel spacing) that is matched to the laser optical spectrum 107 (and correspondingly, to the repetition rate of the mode-locked laser 106). For example, if the mode-locked laser 106 has a repetition rate of 10 gigahertz, the optical WDM splitter 108 provides individual channel spacing that is also 10 gigahertz, in the illustrated embodiment of FIG. 1. This allows the optical WDM splitter 108 to separate an appropriate number of adjacent individual spectral lines and present them as inputs to the array of optical modulators 110A-110N for further beamforming processing.

The optical WDM splitter 108 provides pairs of adjacent individual spectral lines to each of array of optical modulators 110A-110N, as shown in FIG. 1. For example, the first optical modulator 110A receives a first optical spectral line shown in an optical spectrum 110Aa and an adjacent second optical spectral line shown in an optical spectrum 110Ab for the first and second phase modulators 111Aa, 111Ab, respectively. Correspondingly, the final optical modulator 110N receives a next-to-final optical spectral line shown in an optical spectrum 110Na and an adjacent final optical spectral line shown in an optical spectrum 110Nb for next-to-final and final phase modulators 111Na, 111Nb, respectively. These result in corresponding combined optical spectrums 110A, 110N. This illustrated arrangement of employing adjacent individual spectral lines from across the laser optical spectrum 107 allows power and issues of signal isolation within the system to be managed more advantageously than an embodiment employing just two adjacent individual spectral lines throughout the array of optical modulators 110A-110N.

The array of optical modulators 110A-110N, coupled to the optical WDM splitter 108, modulate these spectral line combinations to establish the directional radiation pattern at the RF transmission frequency for the phased array radar transmission. Generally, the beamforming operations of the array of optical modulators 110A-110N are the same wherein specific differences result from the formation of specific elements of the directional radiation pattern. Therefore, a description of the first optical modulator 110A may be generally extended to the remainder of the optical modulators.

Each of the first and second phase modulators 111Aa, 111Ab may provide a phase change of the optical signal associated with the individual spectral line therein creating a relative phase difference between the light output by the phase modulators 111Aa and 111Ab. When the light of these relatively phase-shifted spectral lines is combined in the first combiner 112A, the phase of the RF transmission signal, which is created as a beat signal between them, is phase-shifted accordingly.

Normally, this phase modulation is accomplished linearly and without appreciable amplitude modulation. However, generally, this does not have to be the case. In an alternative embodiment, the optically dispersive element 108 provides a wavelength dependent delay of all spectral lines of the laser optical spectrum 107. This provides a "global" phase shift of the spectral lines that may be employed to facilitate overall articulation of the RF transmission beam or to provide an enhanced phase shifting of particular optical modulators.

Amplitude modulation of the combined optical signal 110A, which has been appropriately phase-shifted, is provided by the first amplitude modulator 113A resulting in appropriate changes to the total amplitude. Normally, the amplitude modulator 113A does not add appreciable relative phase modulation. However, any additional phase shift may be compensated within the first optical modulator 110A, if required. The phase-shifted and amplitude-adjusted RF transmission signal is provided employing the optical signal 114A to the first optically-coupled antenna 115A, which is shown in simplified form, for transmission. Correspondingly, the array of optical modulators 110A-110N provides appropriately phase-shifted and amplitude-adjusted optical signals that ultimately form a phased array RF transmission beam resulting in a directional radiation pattern.

The controller 120 provides the necessary beam forming controls for the optical beamforming RF transmitter 100. Fourier transformations, corresponding to a desired directional radiation pattern, provide required beamforming parameters for each of the individual antennas that will be active (i.e., radiating energy). This information provides the phase and amplitude requirements for each active antenna aperture and allows generation of different beam patterns, as required.

Figure 2:
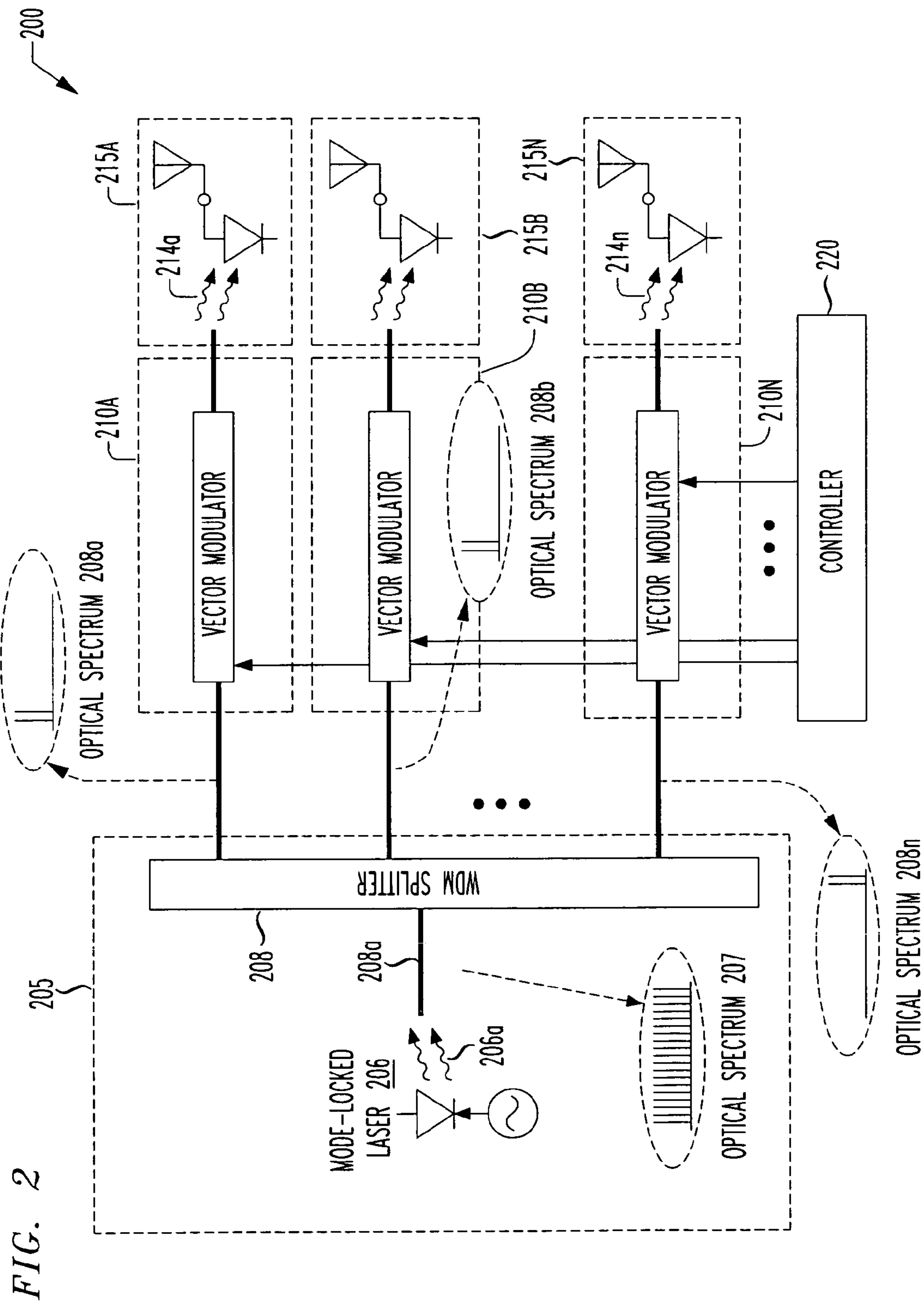
FIG. 2 illustrates a system diagram of an alternative embodiment of an optical beamforming RF transmitter constructed in accordance with the principles of the present invention.

Turning now to FIG. 2, illustrated is a system diagram of an alternative embodiment of an optical beamforming RF transmitter, generally designated 200, constructed in accordance with the principles of the present invention. The optical beamforming RF transmitter 200 includes an optical beamforming generator 205, an array of optical modulators 210A-210N, an array of optically-coupled antennas 215A-215N and a controller 220. The optical beamforming generator 205 includes a mode-locked laser 206 and an optical WDM splitter 208, which is optically coupled to the mode-locked laser 206 by a laser output signal 206*a* through an optical input 208*a*. A first of the optical modulators 210A-210N, which is also exemplary of the remaining optical modulators, employs a vector modulator that provides an optical coupling 214*a* to a first optically-coupled antenna 215A.

The mode-locked laser 206 employs an optical pulse having a repetition rate that is mode-locked to the RF transmission frequency and operates to provide a laser optical spectrum 207, as discussed with respect to FIG. 1. The optical WDM splitter 208 employs the comb array of spectral lines in the laser optical spectrum 207 and operates as a demultiplexer, as before. However, the free spectral range periodicity of the optical WDM splitter 208 is twice that of the mode-locked laser 206 (i.e., 20 gigahertz, instead of the 10 gigahertz of FIG. 1, for a mode-locked laser repetition rate of 10 gigahertz). Therefore, the optical WDM splitter 208 transmits two of the spectral lines of the laser optical spectrum 207 at each output port, thereby employing half as many output ports as the optical WDM splitter 108 of FIG. 1 for the same number of optical modulators. Correspondingly, the optical WDM splitter 208 transmits a pair of adjacent spectral lines to each of its output ports whereas the optical WDM splitter 108 transmits one spectral line to each of its output ports. This difference may be seen in the first, second and final optical spectrums 208*a*, 208*b*, 208*n* of FIG. 2.

The separate and conventional phase and amplitude modulators employed in the embodiment of FIG. 1 have been replaced with vector modulators in the embodiment of FIG. 2. The vector modulators provide vector modulation of both phase and amplitude modifications in forming a transmission beam optically. Each of the array of optical modulators 210A-210N ultimately produce a transmission signal having the same RF frequency, since the separation of the spectral lines is always the same (e.g., 10 gigahertz). Generally, each vector modulator uses a vector representation, such as in-phase and quadrature-phase optical signals) of the amplitude and phase of the output signal generated from its two inputs with respect to the other vector modulator outputs.

The vector modulators may also employ signal delays (e.g., delay line outputs that are appropriately combined for both the amplitude and phase). In one embodiment, the amplitude of both in-phase and quadrature-phase components of a beamforming signal are modulated. Examples of such modulation are described in U.S. patent application Ser. No. 10/674,722 filed by Young-Kai Chen and Andreas Leven on Sep. 30, 2003 and U.S. patent application Ser. No. 10/133,469 filed by Young-Kai Chen on Apr. 26, 2002, which are incorporated by reference herein in their entirety.

As before, the phase-shifted and amplitude-adjusted RF transmission signal is provided employing an optical coupling 214*a* to the optically-coupled antenna element 215A, which is shown in simplified form, for transmission. Correspondingly, each of the array of optical modulators 210A-210N provides appropriately phase-shifted and amplitude-adjusted optical signals for use by the corresponding optically-coupled antennas 215A-215N to form a phased array transmission beam of RF transmission signals.

The controller 220 provides general control of the beamforming function as was described in the discussion with respect to FIG. 1. Additionally, an alternative embodiment of the optical beamforming generator 205 may employ an optically dispersive element between the mode-locked laser 206 and the WDM splitter 208 to provide a global phase shift as was also discussed with respect to FIG. 1.

Figure 3:
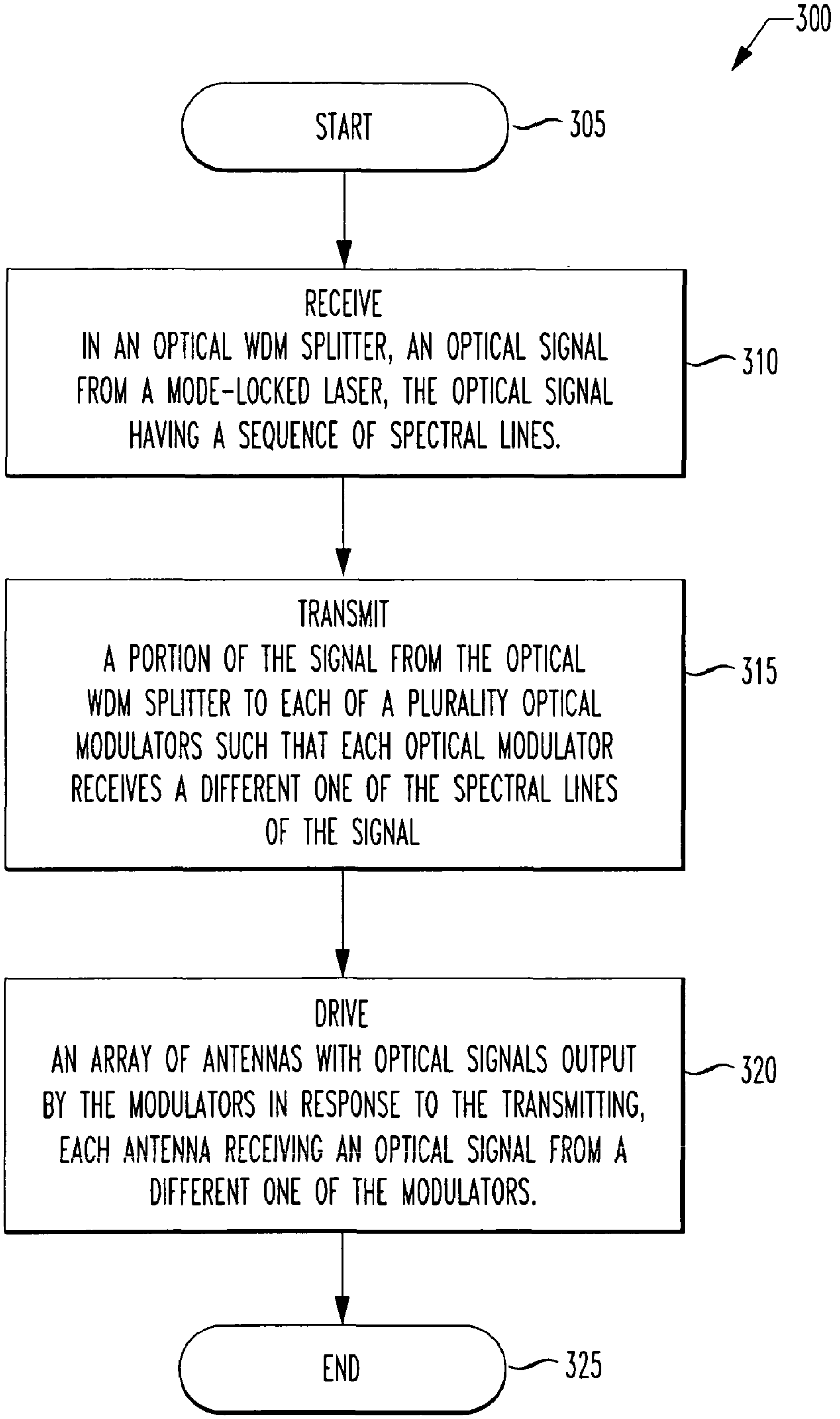
FIG. 3 illustrates a flow diagram of an embodiment of a method of optically generating an RF transmission beam carried out in accordance with the principles of the present invention.

Turning now to FIG. 3, illustrated is a flow diagram of an embodiment of a method of optically generating an RF transmission beam, generally designated 300, carried out in accordance with the principles of the present invention. The method 300 starts in a step 305 and may be used, for example, to provide spectral lines as portions of an optical spectrum that are used to form building blocks for a directional radiation pattern of RF transmitted energy as was discussed with respect to FIGS. 1 and 2. In a step 310, an optical signal is received from a mode-locked laser having a spectrum in the frequency domain that is a sequence of spectral lines corresponding to a time domain repetition rate of the optical signal. An equal and regular spacing of the spectral lines and therefore, the repetition rate of the optical signal correspond to an RF transmission frequency.

Then, in a step 315, a portion of the signal from the optical WDM splitter is transmitted to each of a plurality of optical modulators such that each optical modulator receives at least one different spectral line of the signal. If each optical modulator employs two inputs, a single spectral line is transmitted to each input such that the spacing between them corresponds to a desired RF transmission frequency. If each optical modulator employs a single input, such as may be the case for a vector modulator, two spectral lines are transmitted. The number of spectral lines that are selected and transmitted correspond to matching of a free spectral range periodicity of the optical WDM splitter to the individual or the pairs of spectral lines in the optical spectrum.

In a step 320, an array of antennas is driven with output optical signals provided by the optical modulators. These output optical signals are in response to the spectral lines transmitted by the optical WDM splitter such that each antenna receives an output optical signal from a different one of the optical modulators. Each of the optical modulators provides relative phase and amplitude changes that correspond to a desired directional radiation pattern for the array of antennas. Each of the antennas converts a received output optical signal to an electrical signal at the target RF transmission frequency. The method 300 ends in a step 325.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

In summary, embodiments of the present invention employing a method of optically generating an RF transmission beam and an optical beamforming RF transmitter employing the method have been presented. Illustrated embodiments of the invention combine a mode-locked laser and an optical WDM splitter, operating in a demultiplexer mode, to provide optical spectral lines separated by a desired target transmission frequency. Advantages include providing adjacent optical spectral lines and corresponding optical signals, separated by the required target transmission frequency. These spectral lines may be optically phase or amplitude modulated in a variety of ways and among a variety of independent, parallel optical modulators to provide at least one directional radiation pattern.

In the embodiments of FIGS. 1 and 2, the selected optical signals are phase and amplitude modulated directly to provide beamsteering for a radar transmission. However, one skilled in the pertinent art will understand that data may also be modulated onto the directional radiation pattern to accommodate applications other than radar.

Although the present invention has been described in detail, those skilled in the art should understand that they can make various changes, substitutions and alterations herein without departing from the spirit and scope of the invention in its broadest form.

What is claimed is:

1. An apparatus, comprising:
- an optical WDM demultiplexer having an input and having a plurality of outputs;
- an array of antennas, each antenna having an optical input configured to drive the corresponding antenna; and
- an array of optical modulators, each modulator having an input connected to one of the outputs of the optical WDM demultiplexer, and an output connected to a corresponding one of the antennas, each modulator being configured to drive the corresponding antenna with an optical signal modulated at a corresponding RF frequency, the RF frequency of different ones of the modulators being about the same.

2. The apparatus of claim 1, further comprising a mode-locked laser having an output optically coupled to the input of the optical WDM demultiplexer.

3. The apparatus of claim 2, wherein the mode-locked laser is configured to produce an output spectrum with a series of at least four regularly spaced spectral lines.

4. The apparatus of claim 3, wherein the mode-locked laser is configured to produce the regularly spaced spectral lines with a spacing that corresponds to a transmission frequency of each of the antennas.

5. The apparatus of claim 2, wherein the optical WDM demultiplexer is configured to transmit different spectral lines of the mode-locked laser to different ones of the outputs of the optical WDM demultiplexer.

6. The apparatus of claim 2, wherein each optical modulator is configured to provide phase and amplitude modification to a portion of an optical signal transmitted from the optical WDM demultiplexer.

7. The apparatus of claim 2, wherein the modulators are configured to cause the array of antennas to provide a directional radiation pattern in response to each antenna receiving a modulated optical signal from one of the optical modulators.

8. A method, comprising:
- receiving in an optical WDM demultiplexer an optical signal from a mode-locked laser, the optical signal having a sequence of spectral lines; and
- transmitting a portion of the signal from the optical WDM demultiplexer to each of a plurality of optical modulators such that each optical modulator receives one of the spectral lines of the signal; and
- driving an array of antennas with optical signals output by the modulators in response to the transmitting, each antenna receiving from a different one of the modulators an optical signal modulated at a corresponding RF frequency, the RF frequency of different ones of the modulators being about the same.

9. The method of claim 8, wherein the sequence of spectral lines provides a series of at least four regularly spaced spectral lines.

10. The method of claim 9, wherein a spacing of the regularly spaced spectral lines corresponds to a transmission frequency of each of the antennas.

11. The method of claim 8, wherein each optical modulator receives at least two different spectral lines in the portion of the signal transmitted from the optical WDM demultiplexer.

12. The method of claim 8, wherein each optical modulator provides phase and amplitude modification to the portion of the signal transmitted from the optical WDM demultiplexer.

13. The method of claim 8, wherein the array of antennas provides a directional radiation pattern in response to each antenna receiving a modulated optical signal from a corresponding different one of the optical modulators.

14. An apparatus, comprising:
- an optical WDM demultiplexer having an input and having a plurality of outputs;
- an array of antennas, each antenna having an optical input configured to drive the corresponding antenna; and
- an array of optical modulators, each of the modulators of the array of optical modulators:
  - having an output connected to a corresponding one of the antennas; and
  - being configured to receive first and second adjacent spectral lines from the optical WDM demultiplexer.

15. The apparatus of claim 14, wherein each modulator of said array is configured to produce an optical signal modulated at an RF frequency determined by a frequency spacing between the adjacent spectral lines.

16. The apparatus of claim 14, further comprising a mode-locked laser configured to produce said adjacent spectral lines with a frequency spacing that corresponds to a transmission frequency of each of the antennas.

17. The apparatus of claim 14, wherein said array of optical modulators includes a vector modulator configured to modulate a phase and a magnitude of said adjacent spectral lines to produce an optical signal modulated at an RF frequency determined by a frequency spacing between said adjacent spectral lines.

18. The apparatus of claim 14, further comprising a first phase modulator connected to a first output of said WDM demultiplexer configured to provide said first spectral line, and, and a second phase modulator connected to a second output of said WDM demultiplexer configured to provide said second spectral line adjacent to said first spectral line, and a combiner configured to receive an output from each of said first and second phase modulators.

19. The apparatus of claim 18, further comprising an amplitude modulator configured to receive an output from said combiner and to provide an optical signal to an antenna of said array of antennas.

20. The apparatus of claim 14, further comprising a controller configured to control said array of optical modulators to form a phased array RF transmission beam at a frequency determined by a frequency spacing between said adjacent spectral lines.

* * * * *